US010865107B2

(12) United States Patent
Herskowitz et al.

(10) Patent No.: US 10,865,107 B2
(45) Date of Patent: Dec. 15, 2020

(54) NOVEL, HIGHLY EFFICIENT, ECO-FRIENDLY PROCESSES FOR CONVERTING $CO_2$ OR CO-RICH STREAMS TO LIQUID FUELS AND CHEMICALS

(71) Applicant: B.G. Negev Technologies & Applications Ltd., at Ben-Gurion University, Beer-Sheva (IL)

(72) Inventors: Mordechay Herskowitz, Beer-Sheva (IL); Tomy Hos, Rishon Lezion (IL)

(73) Assignee: B.G. NEGEV TECHNOLOGIES & APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 16/334,220

(22) PCT Filed: Sep. 10, 2017

(86) PCT No.: PCT/IL2017/051013
§ 371 (c)(1),
(2) Date: Mar. 18, 2019

(87) PCT Pub. No.: WO2018/051334
PCT Pub. Date: Mar. 22, 2018

(65) Prior Publication Data
US 2019/0225489 A1 Jul. 25, 2019

Related U.S. Application Data

(60) Provisional application No. 62/396,234, filed on Sep. 19, 2016, provisional application No. 62/470,903, filed on Mar. 14, 2017.

(51) Int. Cl.
*C01B 3/12* (2006.01)
*C10G 50/00* (2006.01)
(Continued)

(52) U.S. Cl.
CPC ............... *C01B 3/12* (2013.01); *B01J 21/04* (2013.01); *B01J 21/063* (2013.01); *B01J 23/52* (2013.01);
(Continued)

(58) Field of Classification Search
CPC .......... C10K 3/026; C10G 3/00; C10G 50/00; C01B 2203/0238; B01B 2203/065
(Continued)

(56) References Cited

U.S. PATENT DOCUMENTS 4,624,968 A   11/1986   Kim et al.
5,140,049 A    8/1992   Fiato et al.
(Continued)

FOREIGN PATENT DOCUMENTS

CA    2978832 A1   10/2016
DE    4236263 A1    4/1994
(Continued)

OTHER PUBLICATIONS

International Search Report for Serial No. PCT/IL2017/051013 dated Jan. 8, 2017.
(Continued)

*Primary Examiner* — Thuan D Dang
(74) *Attorney, Agent, or Firm* — McCormick, Paulding & Huber PLLC

(57) ABSTRACT

The invention provides a process for preparing liquid fuels and chemicals, which process comprises feeding carbon monoxide and hydrogen to a hydrogenation reactor, wherein the molar ratio $CO:H_2$ is in the range of 1:0.5 to 1:0.9, catalytically hydrogenating said carbon monoxide in said hydrogenation reactor, condensing the effluent of said hydrogenation reactor to recover one or more organic liquid(s) and an aqueous solution, feeding a non-condensable component of said effluent into an oligomerization
(Continued)

reactor; condensing an effluent discharged from the oligomerization reactor to obtain an additional organic liquid and an additional gaseous stream, separating said additional organic liquid, and either combusting said additional gaseous stream to produce heat and electricity, or processing same to obtain recyclable gaseous streams utilizable in said process.

4 Claims, 6 Drawing Sheets

(51) Int. Cl.
| | |
|---|---|
| C01B 3/38 | (2006.01) |
| C01B 3/50 | (2006.01) |
| C10G 2/00 | (2006.01) |
| C10K 3/02 | (2006.01) |
| B01J 37/02 | (2006.01) |
| C25B 15/08 | (2006.01) |
| B01J 35/10 | (2006.01) |
| B01J 23/745 | (2006.01) |
| B01J 21/06 | (2006.01) |
| C25B 1/00 | (2006.01) |
| B01J 23/52 | (2006.01) |
| C10G 3/00 | (2006.01) |
| B01J 37/00 | (2006.01) |
| B01J 23/755 | (2006.01) |
| B01J 37/03 | (2006.01) |
| B01J 21/04 | (2006.01) |

(52) U.S. Cl.
CPC ........... *B01J 23/745* (2013.01); *B01J 23/755* (2013.01); *B01J 35/1014* (2013.01); *B01J 35/1019* (2013.01); *B01J 35/1038* (2013.01); *B01J 35/1061* (2013.01); *B01J 37/0009* (2013.01); *B01J 37/0036* (2013.01); *B01J 37/0201* (2013.01); *B01J 37/031* (2013.01); *C01B 3/38* (2013.01); *C01B 3/501* (2013.01); *C10G 2/32* (2013.01); *C10G 2/33* (2013.01); *C10G 3/00* (2013.01); *C10G 50/00* (2013.01); *C10K 3/026* (2013.01); *C25B 1/00* (2013.01); *C25B 15/08* (2013.01); *C01B 2203/0238* (2013.01); *C01B 2203/0405* (2013.01); *C01B 2203/065* (2013.01); *C01B 2203/1241* (2013.01); *Y02P 30/20* (2015.11)

(58) Field of Classification Search
USPC ....... 585/317, 324, 327, 326, 329, 502, 504, 585/638
See application file for complete search history.

(56) References Cited

U.S. PATENT DOCUMENTS

| | | |
|---|---|---|
| 5,925,234 A | 7/1999 | Morel et al. |
| 2002/0151605 A1 | 10/2002 | Kibby |
| 2005/0065391 A1 | 3/2005 | Gattis et al. |

FOREIGN PATENT DOCUMENTS

| | | |
|---|---|---|
| WO | 2014111919 A2 | 7/2014 |
| WO | 2015102002 A1 | 7/2015 |
| WO | 2016162866 A1 | 10/2016 |

OTHER PUBLICATIONS

"Production of synthetic gasoline and diesel fuel from dry reforming of methane" by Hanaä Er-rbib et al., Energy Procedia 29 (2012), pp. 156-165.
"Industrial scale experience on steam reforming of CO2-rich gas" by Peter Molgaard Mortensen et al., Applied Catalysis A: General 495 (2015), pp. 141-151.
"High Temperature Electrolysis in Alkaline Cells, Solid Proton Conducting Cells, and Solid Oxide Cells" by Dalgaard Ebbesen et al., Chemicals Reviews 2014, 114, pp. 10697-10734.
"Conversion of vegetable oils on Pt/Al12O3/SAPO-11 to diesel and jet fuels containing aromatics" by Moshe Rabaev et al., Fuel 161 (2015), pp. 287-294.
Oligomerization of olefins from Light Cracking Naphtha over zeolite-based catalyst for the production of high quality diesel fuel by Giuseppe Bellussi et al., Microporous and Mesoporous Materials 164 (2012), pp. 127-134.
Zhihong Yuan and Mario R. Eden et al, "Toward the Development and Deployment of Large-Scale Carbon Dioxide Capture and Conversion Processes", Ind. Eng. Chem Res, vol. 55, Nov. 30, 2015 (Nov. 30, 2015), pp. 3383-3419, XP002770421,DOI: 10.1021/ACS. IECR.5B03277, pp. 3392-3334.
European Extended Search Report for EP Application No. EP 17850410 dated Apr. 23, 2020.

NOVEL, HIGHLY EFFICIENT, ECO-FRIENDLY PROCESSES FOR CONVERTING CO₂ OR CO-RICH STREAMS TO LIQUID FUELS AND CHEMICALS

CROSS-REFERENCE TO RELATED APPLICATIONS

This application is a National Stage application of International Patent Application No. PCT/IL2017/051013, filed on Sep. 10, 2017, which claims priority to U.S. Patent Application No. 62/396,234, filed on Sep. 19, 2016, and U.S. Patent Application No. 62/470,903 filed on Mar. 14, 2017 each of which is hereby incorporated by reference in its entirety.

BACKGROUND

Carbon dioxide, a greenhouse gas, is one of the most significant threats to the environment and one of the main reasons to climate change. Countries around the world have made pledges to the UN during the Paris Climate Change Conference (held in November-December 2015) to reduce greenhouse gas emissions, communicated in a 32 page document (https://www.scribd.com/doc/293105471/The-Final-Paris-Agreement).

One of the major sources of carbon dioxide is flue gas emitted from power stations. It is critical that carbon dioxide be removed from the flue gas or other sources. Commercial facilities for $CO_2$ capture have been installed and advanced technologies for low-cost capture have been implemented. Actually carbon dioxide could serve as a very useful source of carbon for production of fuels and chemicals (Zhihong Yuan, Mario R. Eden and Rafiqul Gani, "Toward the Development and Deployment of Large-Scale Carbon Dioxide Capture and Conversion Processes", Ind. Eng. Chem. Res. 2016, 55, 3383-3419). The major issue is how to integrate $CO_2$ into the production of liquid fuels and chemicals. The challenge is two-fold: develop highly active, selective and stable catalysts for the pertinent catalytic processes and design highly efficient, eco-friendly processes that are commercially viable.

SUMMARY

There are several routes for converting carbon dioxide to liquid fuels and chemicals. One of the potential routes is to first reform it with natural gas in a process called dry-reforming, which was applied commercially (Peter Mølgaard Mortensen and Ib Dybkjær, "Industrial scale experience on steam reforming of $CO_2$-rich gas", Applied Catalysis A: General 495 (2015) 141-151):

$$CH_4 + CO_2 \rightarrow 2CO + 2H_2 \quad \Delta H_{298K} = 247 \text{ kJ/mole} \quad \text{R1.}$$

which may be combined with steam reforming:

$$CH_4 + H_2O \leftrightarrow CO + 3H_2 \quad \Delta H_{298K} = 206 \text{ kJ/mole} \quad \text{R2.}$$

and may be followed by reverse water gas shift:

$$CO_2 + H_2 \rightarrow CO + H_2O \quad \Delta H_{298K} = 41 \text{ kJ/mole} \quad \text{R3.}$$

Combining R1 and R3 yields:

$$CH_4 + (1+x)CO_2 \rightarrow (2+x)CO + (2-x)H_2 + xH_2O \quad \Delta H_{298K} = (247+x41) \text{ kJ/mole} \quad \text{R4.}$$

Since R3 is reversible, at practical conditions x<2/3, thus this process generates a lean hydrogen syngas (0.5≤$H_2$/CO≤1.0). If water is added to the feed so that R2 is included in the process, the $H_2$/CO in the syngas may reach values higher than unity, say 1.5.

Another route which leads to the so-called green fuels is the co-electrolysis of carbon dioxide and steam on solid oxide cells (SOEC) using electricity and thermal energy to produce a syngas (Sune Dalgaard Ebbesen, Soren Højgaard Jensen, Anne Hauch, and Mogens Bjerg Mogensen, "High Temperature Electrolysis in Alkaline Cells, Solid Proton Conducting Cells, and Solid Oxide Cells", Chem. Rev. 2014, 114, 10697-10734). There is enormous progress toward commercialization of this method (John Bøgild Hansen, "Solid oxide electrolysis—a key enabling technology for sustainable energy scenarios", Faraday Discuss., 2015, 182, 9-48).

Then the $H_2$-lean syngas produced by the methods described above can be converted to liquid fuels and chemicals. However, very little has been published on this topic with no real leads to commercial processes. The conversion of $H_2$-lean syngas to hydrocarbons could gain significant commercial acceptance only if:

(i) a suitable catalyst is found for this purpose; and (ii) a highly efficient process is designed, capable of utilizing and transforming various gaseous streams into a suitably proportioned CO/$H_2$ feedstock mixture.

We have recently described the preparation of an effective catalyst. In WO 2014/111919, there has been reported the synthesis of potassium-promoted spinel catalysts of the formula $Fe^{2+}(Fe^{3+}{}_y Al^{3+}{}_{1-y})_2 O_4/K$, wherein y is preferably in the range from 0.3 to 0.7. The catalyst was found to be highly useful in the catalysis of the reaction of carbon dioxide with hydrogen to produce liquid fuels. In a recently filed international patent application, PCT/IL2016/050364, it has been shown that the spinel powder can be formed into extrudates with the aid of a silica binder, and that the so-formed potassium-promoted $Fe^{2+}(Fe^{3+}{}_y Al^{3+}{}_{1-y})_2 O_4$, silica-containing extrudated catalyst effectively advances the conversion of $H_2$-lean syngas to liquid fuels and chemicals. The extrudates described in PCT/IL2016/050364 are prepared by the following method:

(i) lowering the pH of an aqueous alkali-stabilized colloidal silica (suitable colloidal silica include Ludox® HS-30 and Ludox® HS-40 which contain 30% and 40% silica, respectively; their pH is to be lowered to about 6.5-7.5);

(ii) combining said colloidal silica with $Fe^{2+}(Fe^{3+}{}_y Al^{3+}{}_{1-y})_2 O_4$ spinel particles (their synthesis may be found in WO 2014/111919);

(iii) allowing the mixture resulting from step (ii) to transform into a gel;

(iv) adjusting the consistency of said gel to obtain an extrudable mass (under kneading, to adjust the consistency of the mass to achieve water content of about 40-45 wt %);

(v) extruding said mass to form extrudates;

(vi) drying the extrudates (in air, T>100° C., for at least 3 h)

(vii) calcining the dried extrudates (in air, 300≤T≤400° C., for at least 3 h);

(viii) treating the calcined extrudates with an aqueous solution of a potassium salt;

(ix) drying the potassium-containing extrudates resulting from step (viii) (in air, 100≤T≤140° C., for at least 3 h); and (x) calcining the extrudates resulting from step (ix)(in air, 400≤T≤500° C., for at least 6 h).

The so-formed potassium-promoted $Fe^{2+}(Fe^{3+}{}_y Al^{3+}{}_{1-y})_2 O_4$ [0.3≤y≤0.7] silica-containing extrudates consist of 45 to 85% (e.g., 60 to 80%) by weight $Fe^{2+}(Fe^{3+}{}_y Al^{3+}{}_{1-y})_2 O_4$; 10 to 50% (e.g., 15 to 40%) by weight $SiO_2$; and 3 to 10% (e.g., 4 to 8%) by weight potassium. A complete preparation procedure illustrating the synthesis of the spinel powder and its forming into extrudates is given below.

It has also been shown in Example 12 of PCT/IL2016/050364 that $H_2$-leans syngas with $H_2/CO$ molar ratio of 0.7 is an especially suitable feedstock material for producing liquid fuels with the aid of the aforementioned extrudates.

We have now developed an elegant process design which combines together CO hydrogenation reaction, oligomerization reaction and either reverse water gas shift reaction (RWGS) or water gas shift reaction (WGS) to convert gaseous streams of different sources and to produce liquid fuels and chemicals.

For example, as shown below, the process of the invention enables CO and $H_2$-rich waste gases released in many industrial processes (which are mostly combusted to produce electricity) to be utilized as a feedstock for fuel production. In particular, iron and steel processes produce a very high throughput of such gaseous streams. Among them are converter gas (>60% CO), Corex gas (40% CO and 20% $H_2$), blast furnace gas (20% CO) and coke oven gas (50-60% $H_2$) (see Matteo Gazzani, Matteo C. Romano, Giampaolo Manzolini, "$CO_2$ capture in integrated steel works by commercial-ready technologies and SEWGS process", International Journal of Greenhouse Gas Control 41 (2015) 249-267, Minh T. Ho, Andrea Bustamante, Dianne E. Wiley, "Comparison of $CO_2$ capture economics for iron and steel mills", International Journal of Greenhouse Gas Control 19 (2013) 145-159). Lanzatech has developed a commercial fermentation process that produces ethanol from iron and steel plants exhaust gases (http://corporate.arcelormittal.com/news-and-media/news/2015/july/13-07-2015). Fraunhofer Institute also developed a fermentation process producing alcohols and acetone (https://www.fraunhofer.de/en/press/research-news/2015/Juli/fuel-and-chemicals-from-steel-plant-exhaust-gases.html). However, no catalytic processes that convert iron and steel plant exhaust gases to liquid fuels and chemicals have been published.

In another embodiment of the invention which is illustrated in detail below, the $H_2$-lean syngas is supplied by either dry reforming of $CO_2$ with natural gas or $CO_2$ co-electrolysis with steam.

In its most general form, the process of the invention comprises feeding carbon monoxide and hydrogen to a hydrogenation reactor, wherein the molar ratio $CO:H_2$ is preferably in the range of 1:0.5 to 1:0.9, more preferably from 1:0.6 to 1:0.8 and most preferably around 1:0.7, catalytically hydrogenating said carbon monoxide in said hydrogenation reactor over a suitable catalyst, e.g., potassium-promoted $Fe^{2+}(Fe^{3+}{}_y Al^{3+}{}_{1-y})_2O_4$, silica-containing extrudates, condensing the effluent of said hydrogenation reactor to recover one or more organic liquid(s) and an aqueous solution, feeding a non-condensable component of said effluent into an oligomerization reactor; condensing an effluent discharged from the oligomerization reactor to obtain an additional organic liquid and an additional gaseous stream, separating said additional organic liquid, and either combusting said additional gaseous stream to produce heat and electricity, or processing same to obtain recyclable gaseous streams utilizable in said process.

Preferably, the organic liquids which are generated separately in the CO hydrogenation reaction and the oligomerization reaction are combined, undergoing hydro-treatment to form fuel materials, e.g., premium fuel. Hydrogen required for the hydro-treatment is supplied by separating a subsidiary $H_2$ stream from the carbon monoxide and hydrogen syngas mixture, prior to feeding of said syngas to the CO hydrogenation reaction. The process of the invention further comprises converting into olefins the oxygenates dissolved in the aqueous solution recovered from the hydrogenation reaction.

More specifically, the process comprises feeding carbon monoxide and hydrogen to a hydrogenation reactor, wherein the molar ratio $CO:H_2$ is preferably in the range of 1:0.6 to 1:0.8, catalytically hydrogenating said carbon monoxide in said hydrogenation reactor over a suitable catalyst, e.g., the aforementioned potassium-promoted $Fe^{2+}(Fe^{3+}{}_y Al^{3+}{}_{1-y})_2O_4$, silica-containing extrudates, condensing the effluent of said hydrogenation reactor at a first temperature $T_1 > 120°$ C. (for example, $T_1 > 200°$ C. e.g., $220 \leq T_1 \leq 240°$ C.) to obtain a first organic liquid and a first gaseous stream, separating said first organic liquid; condensing said first gaseous stream at a second temperature $T_2 < 100°$ C. (e.g., $30 \leq T_2 \leq 70°$ C.) to obtain a second liquid, which consists of an organic phase and an aqueous phase, and a second gaseous stream; separating said second liquid into a second organic liquid and an aqueous phase; feeding said second gaseous stream into an oligomerization reactor; condensing the effluent discharged from the oligomerization reactor to obtain a third organic liquid and a third gaseous stream, separating third organic liquid and collecting same, and either combusting said third gaseous stream to produce heat and electricity, or processing same to obtain recyclable gaseous streams utilizable in the process of the invention.

Preferably, the liquid organic product (consisting of the first, second and third fractions collected throughout the process) is hydrotreated to form liquid fuels, and the aqueous solution is treated to convert oxygenates present therein to olefins, which are in turn fed to the oligomerization process.

As noted above, the $CO/H_2$ feedstock may be obtained from various sources. For example, when waste gases containing $CO/H_2$ mixtures with varied proportion are used to supply the desired 1:0.6 to 1:0.8 feedstock syngas mixture, then the gaseous stream discharged from the oligomerization reaction flows directly to combustion to generate heat and electricity.

On the other hand, when the $CO/H_2$ mixture used as feedstock in the hydrogenation reaction is supplied either by dry reforming of $CO_2$ with natural gas or by co-electrolysis of $CO_2$ with steam, then the gaseous stream discharged from the oligomerization reaction is utilized in the process, by splitting it into a carbon monoxide stream and carbon monoxide-depleted, carbon dioxide-rich stream. The former is returned to the hydrogenation reaction, where the latter is divided into two subsidiary streams:

one subsidiary carbon monoxide-depleted, carbon dioxide-rich stream is reacted in a series of RWGS reactors over a suitable catalyst to produce CO and water (for example, $TiO_2$—Au(1%) extrudates), following which the effluent of each of said RWGS reactors is separated into water and gaseous stream, to enable recovery of CO from the downstream RWGS reactor and its return to the process; the other subsidiary stream of carbon monoxide-depleted, carbon dioxide-rich stream is recycled to the dry reformer or the co-electrolysis unit.

However, it should be understood that the process of the invention is not limited to the use of a feedstock consisting of lean-hydrogen syngas obtained from dry reforming or co-electrolysis, or from waste gases. In particular, in the drawings appended, whenever a dry reformer is shown, it may be replaced with an electrolysis unit for lean-hydrogen syngas production. It should also be understood that although CO hydrogenation is successfully advanced with the aid of a catalyst, e.g., the $Fe^{2+}(Fe^{3+}_yAl^{3+}_{1-y})_2O_4$, silica-containing extrudates disclosed in PCT/IL2016/050364, the process is not limited to any particular catalyst.

Specific embodiments of the invention are now described in detail in reference to the drawings.

Turning now to FIG. 1, it is seen that the $CO/H_2$ mixture used as feedstock in the hydrogenation reaction is supplied by dry reforming of $CO_2$. Therefore, this variant of the process includes the following four major successive chemical reactions:

dry reforming of natural gas, which takes place in reactor (1), or as an alternative, co-electrolysis;

CO hydrogenation, which occurs in reactor (2);

oligomerization reaction, which is accomplished in reactor (3); and

RWGS, which is carried out in reactor (4), or a plurality of RWGS reactors arranged in series as illustrated in reference to FIG. 7;

Each of said reactors discharges its effluent to a separator (5), (6), (7) and (8), respectively, enabling the separation between condensable and non-condensable reaction products. For the purpose of clarity, cooler(s) interposed between reactors outlets and the corresponding separation units were omitted from FIG. 1; pumps and valves for driving and controlling the flow of reactants and products are also not shown in FIG. 1.

In addition to the four major reactions set forth above, the process includes two auxiliary reactions:

Hydro-treatment (39) of the organic liquids generated by the CO hydrogenation and the oligomerization reactions, to upgrade said organic liquids into highly useful, premium fuel materials, and conversion (47) of the oxygenates dissolved in the aqueous phase generated by the CO hydrogenation reaction into olefins.

The process design shown in FIG. 1 also includes:
CO flow path, for recycling CO separated in separation unit (9), that is, recovered from the gaseous component of the effluent of the oligomerization reaction, through feed lines (10) and (12), provided with CO storage tank (11), back to the CO hydrogenation reactor (2); and $CO_2$-rich stream flow path, for recycling $CO_2$-rich stream separated in separation unit (8), that is, through feed lines (31) to the splitter and via line (13), provided with $CO_2$-rich storage tank (14), back to the dry reformer (1). $H_2$ flow path, enabling $H_2$ subsidiary stream (37) separated from $CO/H_2$ syngas mixture to be supplied to the hydrotreating reaction (39).

The chemical reactions and recycling steps of the process are now described in more detail.

Dry Reforming Reaction

The reaction is carried out in a reactor (1) with a suitable configuration, such as a packed bed reactor (see, for example, ST. C. TEUNER, P. NEUMANN and F. VON LINDE, The Calcor Standard and Calcor Economy Processes, OIL GAS European Magazine March 2001, 44-46; N. R. Udengaard, J.-H. Bak Hansen, D. C. Hanson, J. A. Stal, Sulfur Passivated Reforming Process Lowers Syngas $H_2$/CO Ratio, Oil Gas J. 90 (10), (1992) 62). A feed stream (19) consisting of the natural gas (16; chiefly methane), carbon dioxide (17), water (18) and a recycled gas stream (15) from the process are supplied to the dry reformer (1).

The dry reforming reaction preferably takes place at a temperature between 500 and 1000° C., more preferably between 600 and 900° C., while the pressure is preferably from 20 to 50 atm.

Catalysts suitable for promoting dry reforming of methane are known in the art. For example, nickel-based catalysts on support, or catalysts based on novel metals, can be used, such as those described by Peter Mølgaard Mortensen, Ib Dybkjær, "Industrial scale experience on steam reforming of $CO_2$-rich gas", Applied Catalysis A: General 495 (2015) 141-151. A complete preparation of an illustrative catalyst is given below.

Co-Electrolysis

As indicated above, co-electrolysis unit may be used instead of a dry reformer. See the conditions described by John Bøgild Hansen (supra). For example, the co-electrolysis unit can be operated at about 800° C. and 40 bar (http://vbn.aau.dk/files/80222058/Technology_data_for_SOEC_alkali_and_PEM_electrolysers.pdf).

The outgoing gas stream (20) leaving dry reformer (1)— or the co-electrolysis unit which may be used instead—is cooled to allow separation (5) between water (21) and the main product, which is a non-condensable stream (22) consisting of CO and $H_2$ which is fed to membrane (36), to separate some of the hydrogen thereby forming essentially neat $H_2$-stream (37), while stream (38) is mixed with CO stream (12) to set the syngas composition at the preferred value (e.g., $0.6 \le H_2/CO \le 0.8$). It is this syngas composition which serves as the feedstock in the CO hydrogenation reactor (2).

CO Hydrogenation Reaction

The CO hydrogenation reactor (2) is preferably designed as fixed-bed multi-tubular in a shell (to remove the heat released by the reaction by producing steam in the shell), with potassium-promoted $Fe^{2+}(Fe^{3+}_yAl^{3+}_{1-y})_2O_4$, silica-containing extrudates packed in the tubes for converting carbon monoxide and hydrogen-containing syngas with molar ratio $0.5 \le H_2/CO \le 1.0$, e.g., 1:0.5 to 1:0.9, more preferably from 1:0.6 to 1:0.8 and most preferably around 1:0.7 mixture, to hydrocarbons.

The $H_2$-lean syngas stream (23) is continuously fed to the reactor (2) at WHSV of not less than $0.6\ h^{-1}$, preferably not less than $0.8\ h^{-1}$ and more preferably not less than $0.9\ h^{-1}$. The reaction is carried out at a temperature in the range from 250 to 300° C. at pressure of not less than 20 atmospheres, e.g., from 30 to 50.

The effluent (24) discharged from reactor (2) is cooled-down and separated (6) into an organic liquid component (25) that flows to the hydrotreating reactor (39), an aqueous stream (46) that flows to the olefins production reactor (47) and a gaseous component (26); the effluent is in fact cooled down at two-stages ($T_1 > 120°$ C. and then $T_2 < 100°$ C.), allowing the separation of the liquid into an organic product and an aqueous phase.

The Hydrotreating Reaction

Hydrotreating is a process that converts hydrogenizes olefins to paraffins, hydro-isomerizes straight paraffins to branched paraffins and mildly hydrocracks heavy paraffins to lighter paraffins, thus improving the quality of the organic product as liquid fuel. For example, the hydrotreatment reaction may be carried out according to processes developed in the Blechner Center at Ben-Gurion University of the Negev (see Moshe Rabaev, Miron V. Landau, Roxana Vidruk-Nehemya, Viatcheslav Koukouliev, Ruby Zarchin, Moti Herskowitz, "Conversion of vegetable oils on $Pt/Al_2O_3/$SAPO-11 to diesel and jet fuels containing aromatics", Fuel 161 (2015) 287-294; Miron V. Landau, Mordechai Herskowitz, Moshe Rabaev, Roxana Vidruk-Nehemya, WO 2015/102002 A1). The hydrotreating reaction is performed in a trickle-bed reactor (39) where the organic liquid from streams (25) and (28) flow downwards in parallel with hydrogen in stream (37). Useful catalysts may be selected from the group consisting of Pt/Al$_2$O$_3$/SAPO-11, NiP/Zeolite Y and a mixture thereof. The operating conditions are 300-360° C., 20-40 bar and LHSV Of 3-7 h$^{-1}$. The effluent (40) is separated in separator (41) into a premium liquid fuel (42) that can be separated into gasoline, jet and diesel fuel and a gaseous phase (43) that is splitted into stream (44) recycled back to the reactor (39) and purge stream (45) recycled to the dry reformer (1).

Oxygenates to Olefins Reaction

The oxygenates in the aqueous stream (46) are converted to lower olefins in reactor (47). For example, suitable reaction conditions were described by Colin Smith, Vanessa Lebarbier Dagle, Matthew Flake, Karthikeyan K. Ramasamy, Libor Kovarik, Mark Bowden, Thomas Onfroy and Robert A. Dagle, "Conversion of syngas-derived C2+ mixed oxygenates to C3-C5 olefins over Zn$_x$Zr$_y$O$_z$ mixed oxide catalysts", Catal. Sci. Technol., 2016, 6, 2325-2336). Briefly, the reaction is performed at 400-500° C., 1-15 bar and WHSV=0.3-1 h$^{-1}$. The effluent (48) is separated in separator (49) into water (50) and a gaseous stream (51) fed to the oligomerization reactor (3).

The non-condensable, outgoing gas stream (26) leaving the CO hydrogenation reactor (2) via separation unit (6) consists of carbon monoxide, carbon dioxide, hydrogen, light olefins and light paraffins. This gaseous stream (26) is directed to the oligomerization reactor (3), where it will be processed to yield further useful liquid products.

The Oligomerization Reaction

The oligomerization is conducted in an adiabatic, fixed-bed reactor (3) packed with a catalyst known in the art such as described by Giuseppe Bellussi, Franco Mizia, Vincenzo Calemma, Paolo Pollesel, Roberto Millini, "Oligomerization of olefins from Light Cracking Naphtha over zeolite-based catalyst for the production of high quality diesel fuel", Microporous and Mesoporous Materials 164 (2012) 127-134.

The reaction is carried out at a temperature in the range from 150 to 260° C., at pressure of not less than 30 atmospheres, e.g., from 30 to 50.

The effluent (27) is cooled-down with the aid of a cooler (not shown) to about 40° C. to remove the organic liquid containing hydrocarbons which is then separated (7) with stream (28) flowing to reactor (39). The gaseous product stream (29) (containing mainly carbon dioxide, hydrogen and light paraffins, C$_1$-C$_3$) is mixed with gaseous mixture (35) described below and fed to a unit (9) that removes CO by methods known in the art, such as PSA (pressure swing adsorption) http://www.tkgf.chemchina.com/sctyen/cpyfw/jsjs/webinfo/2012/06/1345513917857785.html) or with the aid of a suitable membrane (Foerg Wolfgang Ger. Offen. (1994), DE 4236263 A1 19940428; http://www.linde-engineering.com/en/process_plants/hydrogen_and_synthesis_gas_plants/gas_products/carbon_monoxide/index.html) and recycled back through line (10→12), to the CO hydrogenation reactor (2) to adjust its hydrogen-carbon monoxide feed mixture. The CO-depleted, CO$_2$-rich gas stream (31) is split into gaseous stream (32) that is fed to the RWGS reactor (4) and gaseous stream (13) back to the dry reformer via stream (15).

RWGS Reaction

The RWGS takes place in a series of adiabatic fixed-bed reactors with interim cooling and water separation designed as packed Reactor (4) packed with a suitable RWGS catalyst, for example, Katalco 71-5, and water separation (8).

The conditions in reactor (4) include WHSV of not less than 1 h$^{-1}$, preferably not less than 2 h$^{-1}$. The reaction is carried out at a temperature in the range from 400 to 500° C. at pressure of not less than 30 atmospheres, e.g., from 30 to 50.

The incoming feed stream consists of CO-depleted, CO$_2$-rich gas stream (32). The ratio H$_2$ to CO$_2$ in the feed mixture is sub-stoichiometric; preferably from $0.2 \leq H_2/CO_2 \leq 0.8$.

The effluent (33) is cooled-down to separate in (8) water (34). The outgoing non-condensable component stream (35) is mixed with stream (29) and flows to CO separator (9).

Accordingly, the variant of the process illustrated in FIG. 1 comprises either dry reforming carbon dioxide, or co-electrolysis of carbon dioxide and steam, to produce a mixture of carbon monoxide and hydrogen, separating hydrogen in part from said mixture, to form syngas feedstock, feeding said syngas—wherein the molar ratio CO:H$_2$ is preferably in the range of 1:0.5 to 1:0.9, more preferably from 1:0.6 to 1:0.8 and most preferably around 1:0.7—to a hydrogenation reactor, catalytically hydrogenating said carbon monoxide in said hydrogenation reactor over a suitable catalyst, e.g., the aforementioned potassium-promoted Fe$^{2+}$(Fe$^{3+}_y$Al$^{3+}_{1-y}$)$_2$O$_4$, silica-containing extrudates, condensing the effluent of said hydrogenation reactor at a first temperature T$_1$>120° C. (e.g., $220 \leq T_1 \leq 240°$ C.) to obtain a first organic liquid and a first gaseous stream, separating said first organic liquid and collecting same; condensing said first gaseous stream at a second temperature T$_2$<100° C. (e.g., $30 \leq T_2 \leq 70°$ C.) to obtain a second liquid, which consists of an organic phase and an aqueous phase, and a second gaseous stream; separating said second liquid into a second organic liquid and an aqueous phase; feeding said second gaseous stream into an oligomerization reactor; condensing the effluent discharged from the oligomerization reactor to obtain a third organic liquid and a third gaseous stream, separating and collecting third organic liquid, splitting said third gaseous component into a carbon monoxide stream and carbon monoxide-depleted, carbon dioxide-rich stream (using for example pressure swing adsorption (PSA) or a membrane), recycling said carbon monoxide stream to said hydrogenation reactor; dividing said carbon monoxide-depleted, carbon dioxide-rich stream into two subsidiary streams, wherein one subsidiary CO$_2$-containing stream is used to supply CO$_2$ to the dry reforming reaction, and the other CO$_2$-containing stream is reacted with hydrogen in RWGS reactor to produce CO and water, following which the effluent of said RWGS reactor is separated into water and CO-containing stream which is used to supply CO to the hydrogenation reaction. Preferably, the process further comprises hydrotreating one or more organic products collected in the process to form premium liquid fuels, and converting oxygenates in the aqueous solution into olefins which are fed to the oligomerization reactor.

The invention also provides a process based on the embodiment illustrated in FIG. 1, comprising:

(i) dry reforming of natural gas with carbon dioxide or co-electrolyzing carbon dioxide with steam to yield H$_2$-lean syngas ($0.5 \leq H_2/CO \leq 1.5$);

(ii) optionally separating the excess hydrogen from the syngas to set it at the optimal value ($0.5 \leq H_2/CO \leq 0.9$), thereby generating a H$_2$ stream;

(iii) adjusting the feed to the carbon monoxide hydrogenation reactor by mixing the syngas with recycled carbon monoxide to set it at its optimal value ($0.5 \leq H_2/CO \leq 0.9$);

(iv) converting said H$_2$-lean syngas in the presence of the a suitable catalyst, e.g., the potassium-promoted Fe$^{2+}$(Fe$^{3+}_y$Al$^{3+}_{1-y}$)$_2$O$_4$ silica-containing pellets, to yield higher hydrocarbons;

(v) separating the organic liquid and the water products by cooling in two stages to about 40-70° C.;
(vi) feeding the gaseous product obtained in step (v) to the oligomerization catalytic reactor;
(vii) separating the organic liquid product by cooling the product to 40° C.;
(viii) separating the carbon monoxide from the gaseous product e.g., by pressure swing adsorption (PSA) or by a membrane, thereby generating a recyclable CO stream and $CO_2$-rich gas mixture;
(ix) splitting the $CO_2$-rich gas mixture into two subsidiary streams;
(x) feeding one of the subsidiary $CO_2$-rich streams obtained in step (ix) to the dry reformer or to the co-electrolysis unit;
(xi) feeding the other $CO_2$-rich stream and $H_2$ obtained in step (xii) to the RWGS reactor, and converting $CO_2$ to CO over a suitable catalyst, e.g., KATALCO 71-5 and feeding it back to the carbon monoxide separator to supply CO for hydrogenation.

Turning now to FIGS. 2 and 3, processes designs illustrated in these drawing are aimed at managing waste gas as a raw material. In general, waste gases produced by the industry can be divided into two groups:
1. feed with $H_2/CO$ molar ratio of <0.7; and
2. feed containing $CO_2$, with $H_2/CO$ molar ratio of >0.7.

In group 1, the waste gas is fed to a WGS reactor to convert part of the CO and produce excess hydrogen, transferred through a membrane to separate said excess hydrogen so that ultimately the $H_2/CO$ molar ratio is adjusted to about 0.6-0.8, e.g., ~0.7; in group 2, the waste gas is fed to a RWGS reactor to convert the $CO_2$ and $H_2$ to CO and then is passed through a membrane to separate hydrogen and adjust the $H_2/CO$ in the feed to 0.6-0.8, e.g., ~0.7. Thus, the process for converting waste gases to liquid fuels and chemicals is based on three steps carried out in succession:
1. Adjustment of the hydrogen to CO ratio to about 0.7, either by subjecting the waste gas to a WGS reaction (in case of molar $H_2/CO$<0.7 in the waste gas) followed by excess hydrogen removal, e.g., with the aid of a membrane; or by subjecting the waste gas to RWGS reaction (in case of molar $H_2/CO$>0.7 in the waste gas).
2. Conversion of CO to liquid fuels and chemicals in a CO hydrogenation reactor.
3. Conversion of light olefins to higher hydrocarbons in a oligomerization reactor.

The pertinent reactions were already outlined above with the exception of WGS reaction which is now described.

WGS Reaction

The WGS reaction is the reverse reaction of RWGS. Therefore, the same configuration, catalyst and operating conditions are used. Since the chemical equilibrium constant of this reaction is much higher than that of RWGS, only one adiabatic reactor is used.

Turning now to the pertinent drawings, FIG. 2 depicts the group of waste gases containing molar $H_2/CO$<0.7, e.g., <0.5. The waste gas (101) is compressed to 40-50 bars in compressor (103) to stream (104) mixed with steam (102) and reacted in the WGS reactor (400) to generate stream (105) that flows to separator (8) to separate water (107) and a gaseous stream (106) that runs through a membrane (108) to separate hydrogen (109) and a syngas (110) containing $H_2/CO$ molar ratio of 0.6-0.8, e.g., ~0.7. Stream (110) reacts in the CO hydrogenation reactor (2) to produce liquid fuels and chemicals under the conditions set forth above for the hydrogenation reaction. Effluent stream (111) is separated in separator (6) into organic liquid (112) and water (123) and a non-condensable component containing carbon dioxide, carbon monoxide, hydrogen, light olefins and paraffins (113). The organic liquid (112) generated by the CO hydrogenation reaction, together with the organic liquid (115) generated by the oligomerization reaction, and hydrogen streams (109) and (121) flow to hydrotreater (116) as described to produce from effluent (117), following separation (118) premium fuel (119) and subsequently tail gas (120→122), suitable for combustion for generating heat and electricity. The light olefins in the non-condensable streams (113) and (128) are further reacted in the oligomerization reactor (3). The effluent (114) is separated in separator (7) to organic liquid (115) and tail gas (129) suitable for combustion for generating heat and electricity. Numerals (123, 124, 125, 126, 127, 128) are as described in FIG. 1 for olefins production (46, 47, 48, 49, 50, 51, respectively).

Accordingly, in the variant corresponding to FIG. 2, a process is provided, wherein the carbon monoxide and hydrogen feedstock is supplied from waste gases (101) characterized by having $H_2/CO$ molar ratio of <0.5, the process comprises subjecting said waste gas to water gas shift (WGS) reaction (400) to convert part of the CO so that the $H_2/CO$ molar ratio increases, and separating excess hydrogen (109) in a membrane (108) so that the $H_2/CO$ molar ratio of the stream (110) fed to CO hydrogenation reactor (2) is adjusted to about 0.6-0.8, and hydrogenating (2) the product of said WGS reaction.

FIG. 3 depicts the group of waste gases with molar ratio $H_2/CO$>0.7, e.g., >0.9. The waste gas (71) is compressed to 40-50 bars in compressor (72) to stream (73) and reacted in the RWGS reactor (4) to generate stream (74) containing molar $H_2/CO$≥0.7 and steam, under the conditions described above for the RWGS reaction. The steam is condensed and separated in separator (8) into a water stream (75) and a gaseous stream (76) from which hydrogen is removed in membrane (77), flowing in stream (78). Stream (79) recovered in the membrane is reacted in the CO hydrogenation reactor (2) to produce liquid fuels and chemicals. Effluent stream (80) is separated in separator (6) into organic liquid (81) and water (92) (treated 93, 94, 95, 96, 97, as previously described for corresponding olefins production) and a non-condensable effluent containing carbon dioxide, carbon monoxide, hydrogen, light olefins and paraffins (82). The organic liquid (81) generated in the CO hydrogenation reaction is combined with the organic liquid (84) produced by the oligomerization reaction (3) and together with hydrogen streams (78) and (90) flow to hydrotreater (85) to produce from effluent (86), following separation (87), premium fuel (88) and tail gas (89→91) suitable for combustion for generating heat and electricity. The light olefins in the non-condensable streams (82) and (97) are further reacted in the oligomerization reactor (3). The effluent (83) is separated in separator (7) to organic liquid (84) and tail gas (98) suitable for combustion for generating heat and electricity.

Although a single RWGS reactor is show in FIG. 3, it should be understood that a preferred arrangement consists of a plurality of reactors ($R_1, R_2, \ldots R_n$) arranged in series, for example, reactors packed with $TiO_2$—Au(1%) extrudates. The reaction mixture discharged from the reactor $R_j$ is cooled to enable steam condensation and water separation, whereas the non-condensable component is fed to the next reactor $R_{j+1}$. Ultimately the CO-containing effluent of the downstream reactor $R_n$ is supplied to the CO-hydrogenation reactor as previously described.

Accordingly, in the variant corresponding to FIG. 3, a process is provided wherein the carbon monoxide and hydrogen feedstock is supplied from waste gases characterized by having $H_2/CO$ molar ratio of >0.9 (71), the process comprises subjecting said waste gas to RWGS reaction (4), condensing the product of the RWGS reaction to obtain water and non-condensable component, separating water (75) from the gaseous component (76) and separating hydrogen therefrom (78), and directing the gaseous stream (79) to the hydrogenation reaction.

DETAILED DESCRIPTION

EXAMPLES

Example 1

Carbon Monoxide Reaction with Hydrogen in a Fixed Bed Reactor

Figure 1:
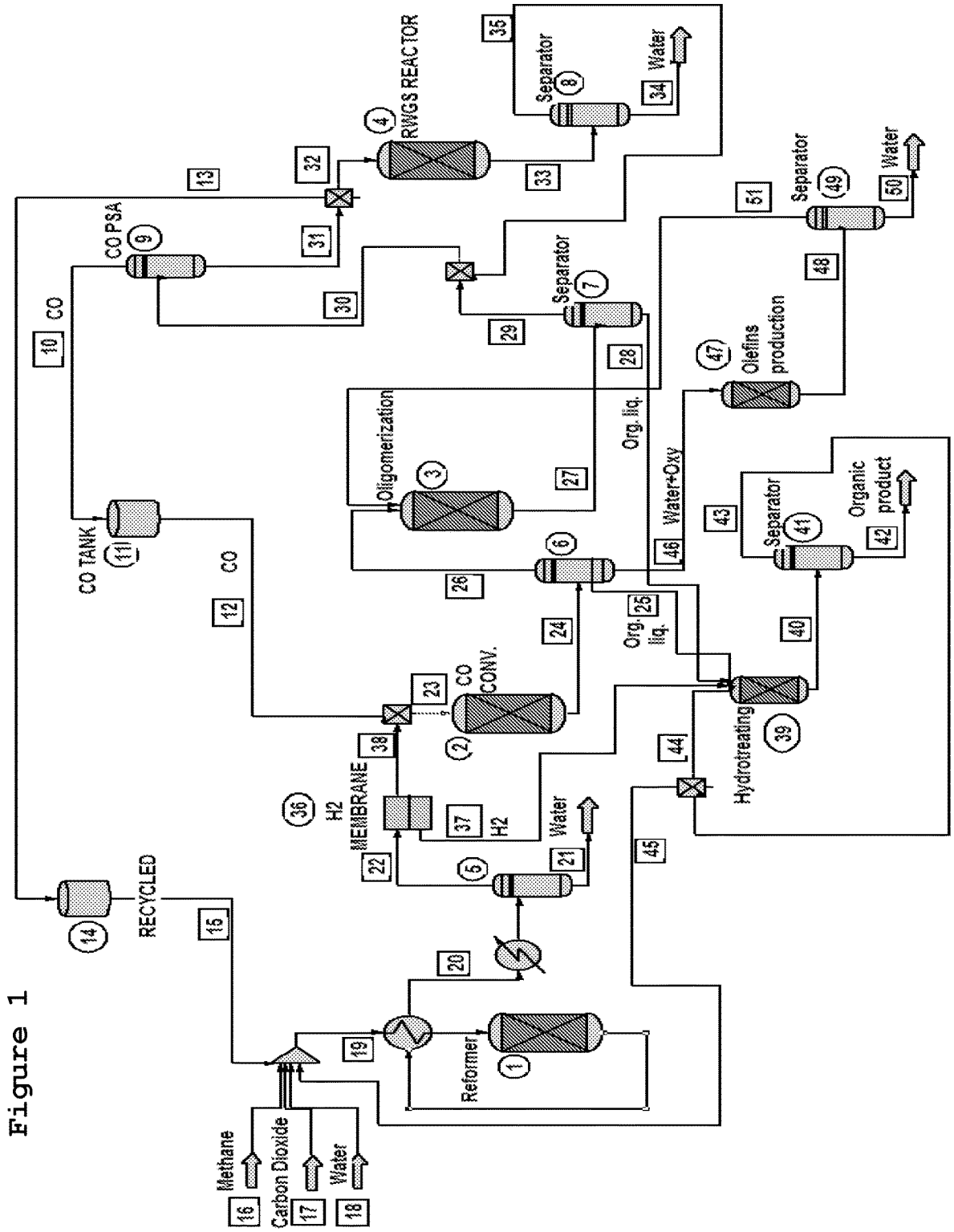
FIG. 1 displays the design of the process of the invention that reacts $CO_2$ and natural gas, combining together the dry reforming, CO hydrogenation and oligomerization reaction.
Figure 2:
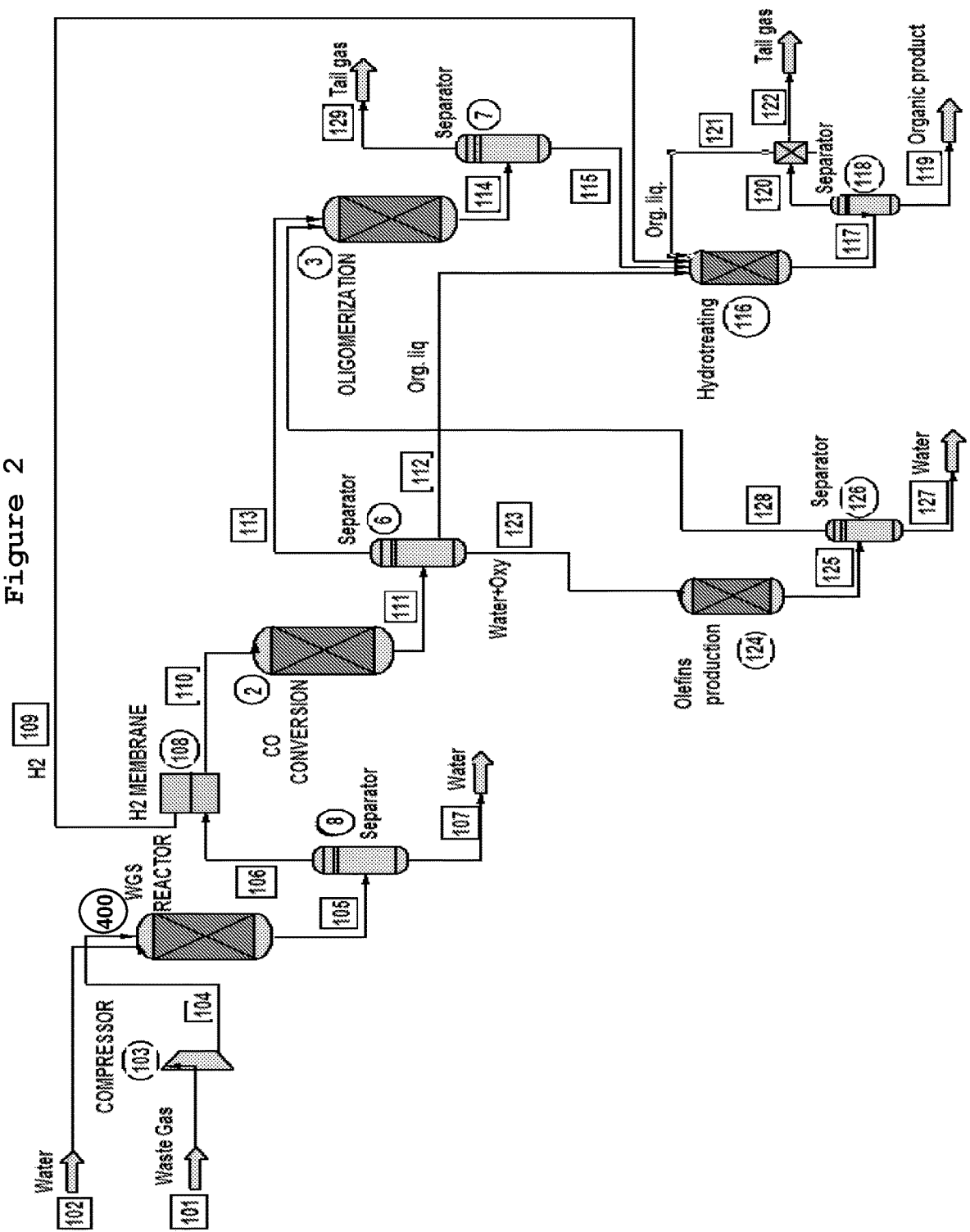
FIG. 2 displays the design of the process of the invention employing waste gas containing $H_2/CO<0.7$, e.g., combining together WGS reaction, CO hydrogenation and oligomerization reaction.
Figure 3:
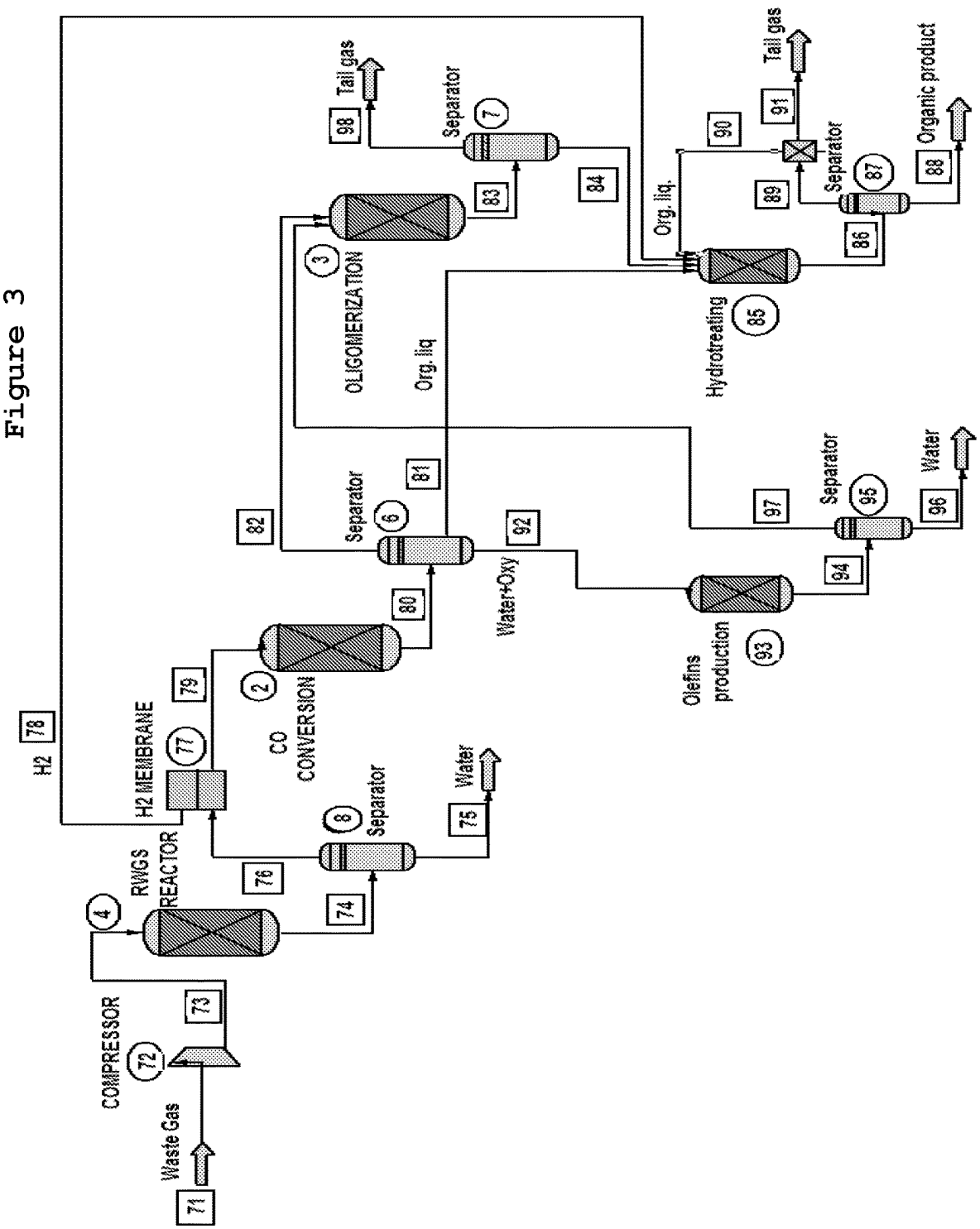
FIG. 3 displays the design of the process of the invention employing waste gas containing $H_2/CO>0.7$, combining together RWGS reaction, CO hydrogenation and oligomerization reaction.
Figure 4:
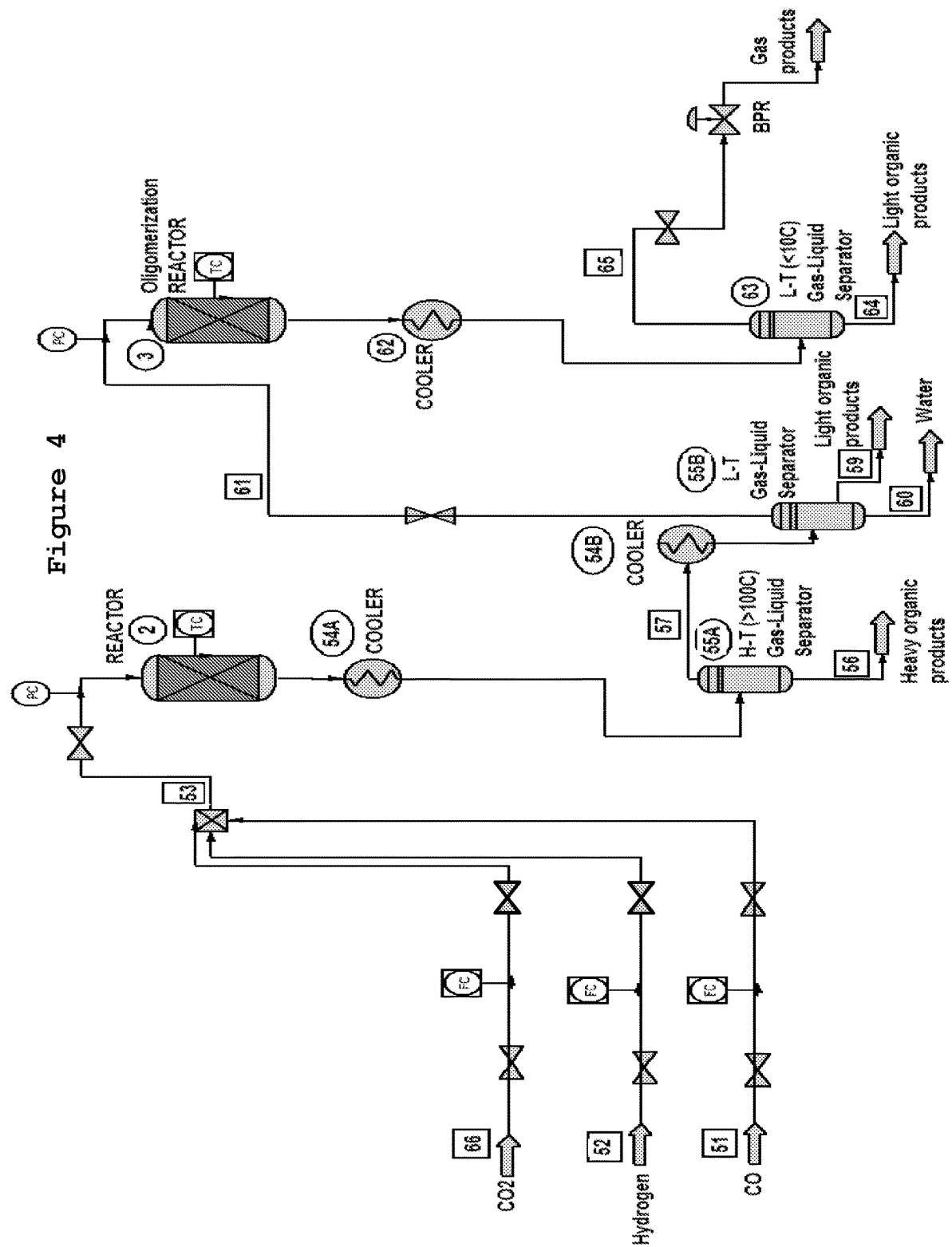
FIG. 4 depicts a schematic description of an experimental set up for CO hydrogenation.

A schematic description of the experimental set-up used for running the hydrogenation of carbon monoxide is shown in FIG. 4. Catalyst activation was done by in-situ reduction in hydrogen at 20 cm$^3$/min*gram$_{cat}$ at temperature of 450° C. and atmospheric pressure in reactor (2), for 4 h.

CO was contacted with $H_2$ by passing a mixture of CO and $H_2$ streams (indicated by numerals (51) and (52), respectively) at a molar ratio 1:0.7 through a tubular reactor (2) (16 mm ID, 250 mm long) packed with 6 gram of the extrudates of Preparation 1 and heated up to 275° C. at a total pressure of 40 atm. All gaseous reactants are fed via line (53) to the reactor (2).

With the aid of a cooler (54A), the reaction products were cooled down to a temperature $T_1$ ($T_1>120°$ C.) to form a mixture consisting of non-condensable and liquid products. The mixture is separated in a first gas-liquid separator (55A) into a first liquid component (56) and a gaseous component (57).

The liquid component consists of a heavy organic phase. It is collected in a vessel through stream (56), constituting the first organic product obtained by the experiment.

The gaseous component is cooled down with the aid of a second cooler (54B) to a temperature $T_2$ (30<$T_2$<60° C.), undergoing condensation to form a mixture consisting of non-condensable materials and liquid products. This mixture is then separated in a second gas-liquid separator (55B) into a liquid component and a gaseous component. The liquid component is separated into organic and aqueous phases, which are collected through lines (59) and (60), respectively. This organic phase constitutes the second organic product obtained by the experiment.

The non-condensable components flowing in line (61) consist of $CO_2$, CO, light hydrocarbons and residual $H_2$ generated by the water gas shift reaction. This gaseous stream enters the oligomerization reactor (3) packed with 6 grams of commercial catalyst heated up to 250° C. and total pressure of 40 atmospheres.

The products of the oligomerization reaction are cooled in a cooler (62) down to $T_3<10°$ C., e.g., 0<$T_3$<5° C., undergoing condensation to a light organic liquid component which is separated from the non-condensable component in a gas-liquid separator (63). The light organic liquid (64) thereby collected constitutes the third organic product obtained by the experiment.

Gas products (65) were analyzed in online Agilent 7890A Series Gas Chromatograph equipped with 7 columns and 5 automatic valves using helium as a carrier gas. The liquid organic products (56, 59 and 64) were analyzed by GC-MS (Agilent Technologies 6890N network GC system equipped with 5973 Network mass-selective detector) as described in more detail below. Aqueous phase (60) was analyzed for Total Organic Carbon in Shimadzu TOC-V$_{CPN}$ Analyzer.

In the tables below, the capital letters X and S stand for conversion and selectivity, respectively. The weight selectivity to $CH_4$, $C_2$-$C_4$ olefins (olefins are abbreviated in the tables below $C_2^=$ and $C_3$-$C_4^=$), $C_2$-$C_4$ paraffins and $C_{5+}$ hydrocarbons was calculated on the carbon basis as $S_i=[C_i/\Sigma C_i]*100\%$, where $C_i$ is the amount of carbon (gram) contained in product (i) produced at period of time, $\Sigma C_i$— amount of carbon (gram) contained in all hydrocarbons produced over the same period of time. The selectivity to $CO_2$, $S_{CO2}=F_{CO2}/(F_{CO,0}-F_{CO})$, was calculated as the moles of $CO_2$ produced per moles of CO reacted.

The Hydrogenation Reaction:

The reaction of carbon monoxide with hydrogen in reactor (2) to produce hydrocarbons was run under the following specific conditions:

WHSV$_{CO}$=0.90 h$^{-1}$, temperature 275° C., total pressure at the reactor 40 atm, $H_2$/CO=0.7 mol/mol. The time on stream was 1100 hours. The results are shown in Table 1.

TABLE 1

| $x_{CO}$, % | $X_{H2}$, % | $s_{C1}$ wt % | $s_{C2-C4}$ wt % | $s_{C2}=$ wt % | $s_{C3}=$ wt % | $s_{C4}=$ wt % | $s_{C5+}$ wt % | Oxygen. in water wt % | $S_{CO2}$ mole % | $H_2$/CO at outlet |
|---|---|---|---|---|---|---|---|---|---|---|
| 75 | 72 | 6.0 | 8.3 | 2.7 | 8.2 | 6.8 | 67.5 | 0.5 | 47 | 0.7 |

Figure 5:
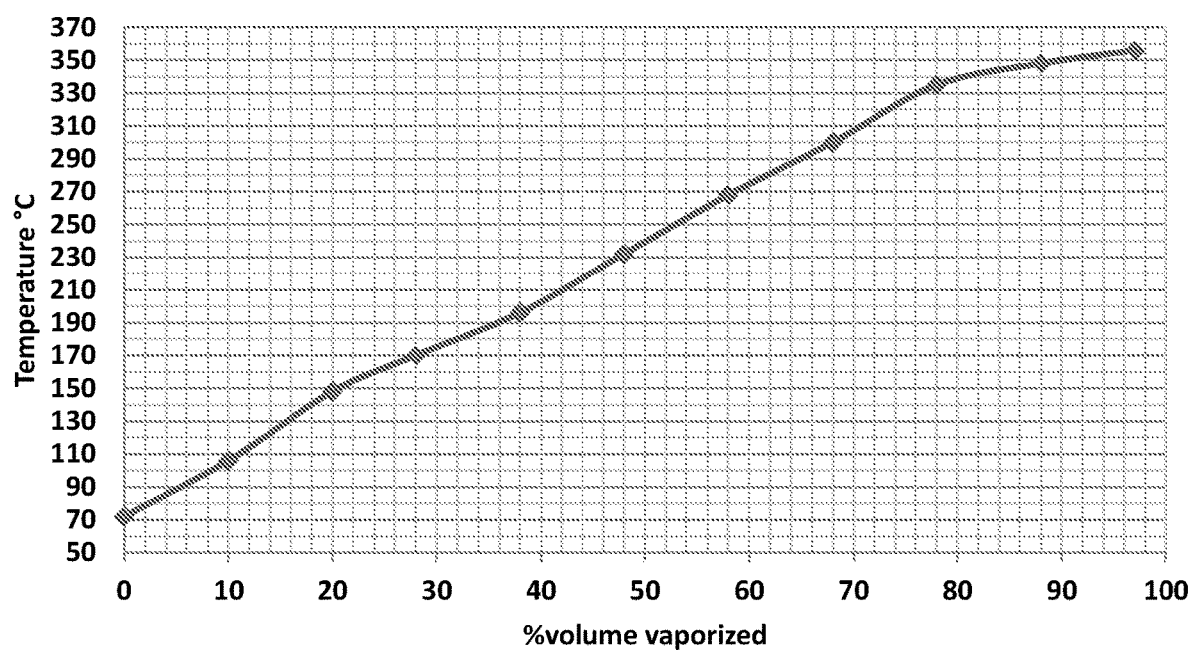
FIG. 5 shows the distillation curve of the organic liquid produced by CO hydrogenation.

Over a period of 70 hours, 42.4 grams of organic liquid and 2.5 grams of aqueous solution were collected. The organic liquids (56, 59) collected in the two separators (55A, 55B, respectively) were mixed and analyzed. The composition of the organic liquid (56+59) is listed in Table 2 while the composition of the aqueous solution (60) is listed in Table 3. The distillation curve of the organic liquid is shown in FIG. 5.

TABLE 2

|  |  | % | Total % |
|---|---|---|---|
| C4 | Olefins | 0.4 | 4.3 |
|  | Paraffins | — |  |
|  | Oxygenates | 3.9 |  |
| C5 | Olefins | 2.1 | 3.6 |
|  | Paraffins | — |  |
|  | Oxygenates | 1.5 |  |
| C6 | Olefins | 2.7 | 6.5 |
|  | Paraffins | 2.6 |  |
|  | Oxygenates | 1.2 |  |
| C7-C10 | non α Olefins | 8.0 | 37.8 |
|  | α Olefins | 13.5 |  |
|  | non n-Paraffins | 2.2 |  |
|  | n Paraffins | 9.7 |  |
|  | Iso-Paraffins | 1.3 |  |
|  | Cyclo-Paraffins | 0.9 |  |
|  | Aromatics | 0.2 |  |
|  | Oxygenates | 2.0 |  |
| C11-C22 | non α Olefins | 10.1 | 41.8 |
|  | α Olefins | 8.9 |  |
|  | non n-Paraffins | 3.3 |  |
|  | n Paraffins | 16.0 |  |
|  | Iso-Paraffins | 2.0 |  |
|  | Cyclo-Paraffins | 1.3 |  |
|  | Aromatics | — |  |
|  | Oxygenates | 0.2 |  |
| >C23 | Olefins | 0.3 | 6.0 |
|  | Paraffins | 5.7 |  |

TABLE 3

| Organic compound | Percentage in Oxygenates Compounds [% wt] |
|---|---|
| C2-C8 Alcohol | 71.8 |
| C2-C4 Carboxylic acid | 24.4 |
| C2-C9 Carboxylic acid & Ester (Acetate ester) | 0.7 |
| C2-C10 Ketone | 3.1 |

The Oligomerization Reaction

The oligomerization reaction (3) to produce hydrocarbons was run under the following specific conditions:

$WHSV_{olefins}=0.03\ h^{-1}$, temperature 250° C., total pressure at the reactor 40 atm. The time on stream was 1050 hours.

Figure 6:
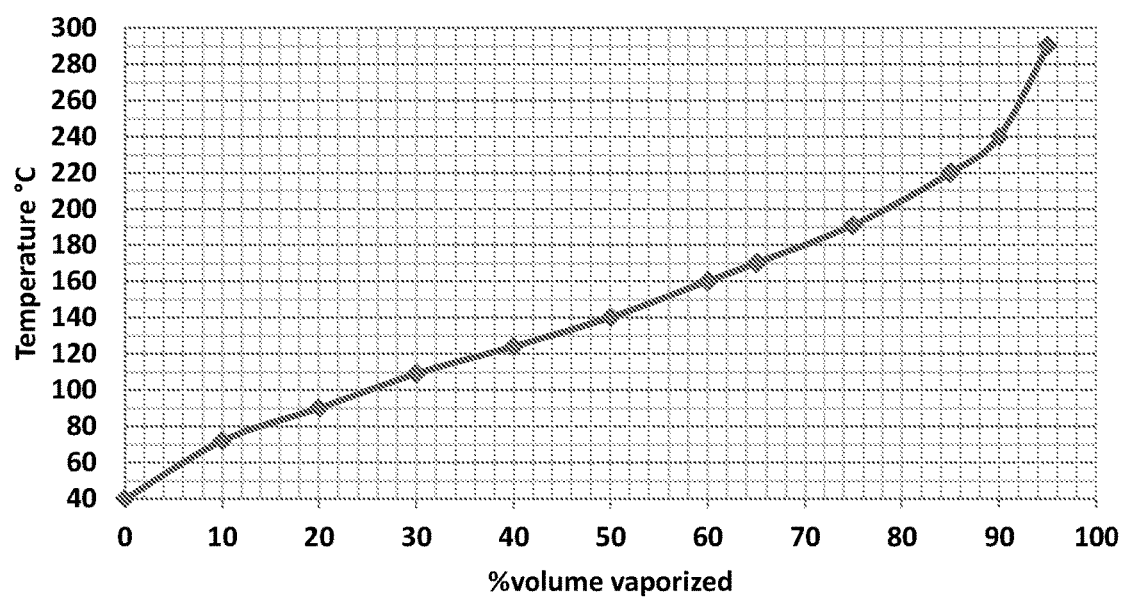
FIG. 6 shows the distillation curve of the organic liquid produced by oligomerization.

The conversion of the light olefins to $C_5+$ hydrocarbons was 75%. The composition of the organic liquid is listed in Table 4. The distillation curve is shown in FIG. 6.

TABLE 4

| C4-C16 | Component | % |
|---|---|---|
| Olefins (43.6%) | α-Olefins | 0.1 |
|  | Non α-Olefins | 9.3 |
|  | Monoalkyl olefins | 13.8 |
|  | Dialkyl olefins | 14.8 |
|  | Trialkyl olefins | 5.6 |
| Paraffins (19.6%) | n-paraffins | 6.7 |
|  | Monoalkylparaffins | 12.0 |
|  | Dialkyl olefins | 0.9 |
| Naphthenes | Naphthenes | 9.1 |
| Aromatics | Aromatics | 12.6 |
| Oxygenates | Oxygenates | 15.1 |

Example 2

Carbon Monoxide Hydrogenation in a Fixed Bed Reactor Fed with a Mixture Containing 21 Molar % Carbon Dioxide This experiment was conducted in a mini-pilot plant with a similar design as in Example 1 schematically described in FIG. 4. The tubular reactor (16 mm ID, 500 mm long) of the mini-pilot was packed with 20 gram of the extrudates of Preparation 1.

The effluent from reactor (2) flows directly to cooler (54B) where it is cooled down to a temperature $T_1$ ($80<T_1<110°$ C.), undergoing condensation into a liquid component and a gaseous component. The liquid component is separated into organic and aqueous phases, which are collected through lines (59) and (60), respectively.

The non-condensable components flowing in line (61) consist of $CO_2$, CO, light hydrocarbons and residual $H_2$ generated by the water gas shift reaction. This gaseous stream enters the oligomerization reactor (3) packed with 20 grams of commercial catalyst heated up to 250° C. and total pressure of 50 atmospheres.

The reaction of carbon monoxide with hydrogen to produce hydrocarbons was run under the following specific conditions:

$WHSV_{CO}=1.0\ h^{-1}$, temperature 275° C., total pressure at the reactor 50 atm, $H_2/CO=0.7$ mol/mol and $CO_2/CO=0.46$ mol/mol. The time on stream was 620 hours. The results are shown in Table 5.

TABLE 5

| $x_{CO}$, % | $X_{H2}$, % | $s_{C1}$ wt % | $s_{C2-C4}$ wt % | $s_{C2}=$ wt % | $s_{C3}=$ wt % | $s_{C4}=$ wt % | $s_{C5+}$ wt % | Oxygen, in water wt % | $S_{CO2}$ mole % | $H_2/CO$ at outlet |
|---|---|---|---|---|---|---|---|---|---|---|
| 76 | 73 | 6.8 | 7.9 | 2.4 | 0.5 | 2.3 | 78.6 | 1.5 | 46 | 0.8 |

The composition of the organic liquid is listed in Table 6.

The oligomerization reaction to produce hydrocarbons was run under the following specific conditions:

$WHSV_{olefins}=0.04\ h^{-1}$, temperature 250° C., total pressure at the reactor 50 atm. The time on stream was 470 hours.

The conversion of the light olefins to $C_5+$ hydrocarbons was 71%. The composition of the organic liquid is listed in Table 7.

TABLE 6

|  |  | % | Total % |
|---|---|---|---|
| C4 | Olefins | — | 1.4 |
|  | Paraffins | — |  |
|  | Oxygenates | 1.4 |  |
| C5 | Olefins | 0.6 | 1.8 |
|  | Paraffins | — |  |
|  | Oxygenates | 1.2 |  |
| C6 | Olefins | 1.7 | 3.3 |
|  | Paraffins | 0.8 |  |
|  | Oxygenates | 0.8 |  |
| C7-C10 | non α Olefins | 4.9 | 31.3 |
|  | α Olefins | 13.2 |  |
|  | non n-Paraffins | 1.9 |  |
|  | n Paraffins | 6.1 |  |
|  | Iso-Paraffins | 0.9 |  |
|  | Cyclo-Paraffins | 0.9 |  |
|  | Aromatics | 0.4 |  |
|  | Oxygenates | 3.0 |  |
| C11-C22 | non α Olefins | 14.9 | 56.3 |
|  | α Olefins | 14.3 |  |
|  | non n-Paraffins | 5.6 |  |
|  | n Paraffins | 15.3 |  |
|  | Iso-Paraffins | 4.2 |  |
|  | Cyclo-Paraffins | 1.4 |  |
|  | Aromatics | — |  |
|  | Oxygenates | 0.6 |  |
| >C23 | Olefins | 0.4 | 5.9 |
|  | Paraffins | 5.5 |  |

TABLE 7

| C4-C16 | Component | % |
|---|---|---|
| Olefins | α-Olefins | 0.8 |
| (37.1%) | Non α-Olefins | 4.0 |
|  | Monoalkyl olefins | 12.8 |
|  | Dialkyl olefins | 15.3 |
|  | Trialkyl olefins | 4.2 |
| Paraffins | n-paraffins | 8.4 |
| (22.4%) | Monoalkyl paraffins | 14.0 |
|  | Dialkyl olefins | — |
| Naphthenes | Naphthenes | 14.5 |
| Aromatics | Aromatics | 17.9 |
| Oxygenates | Oxygenates | 8.1 |

Example 3

RWGS Reaction with Carbon Dioxide and Hydrogen in a Fixed Bed Reactor

Figure 7:
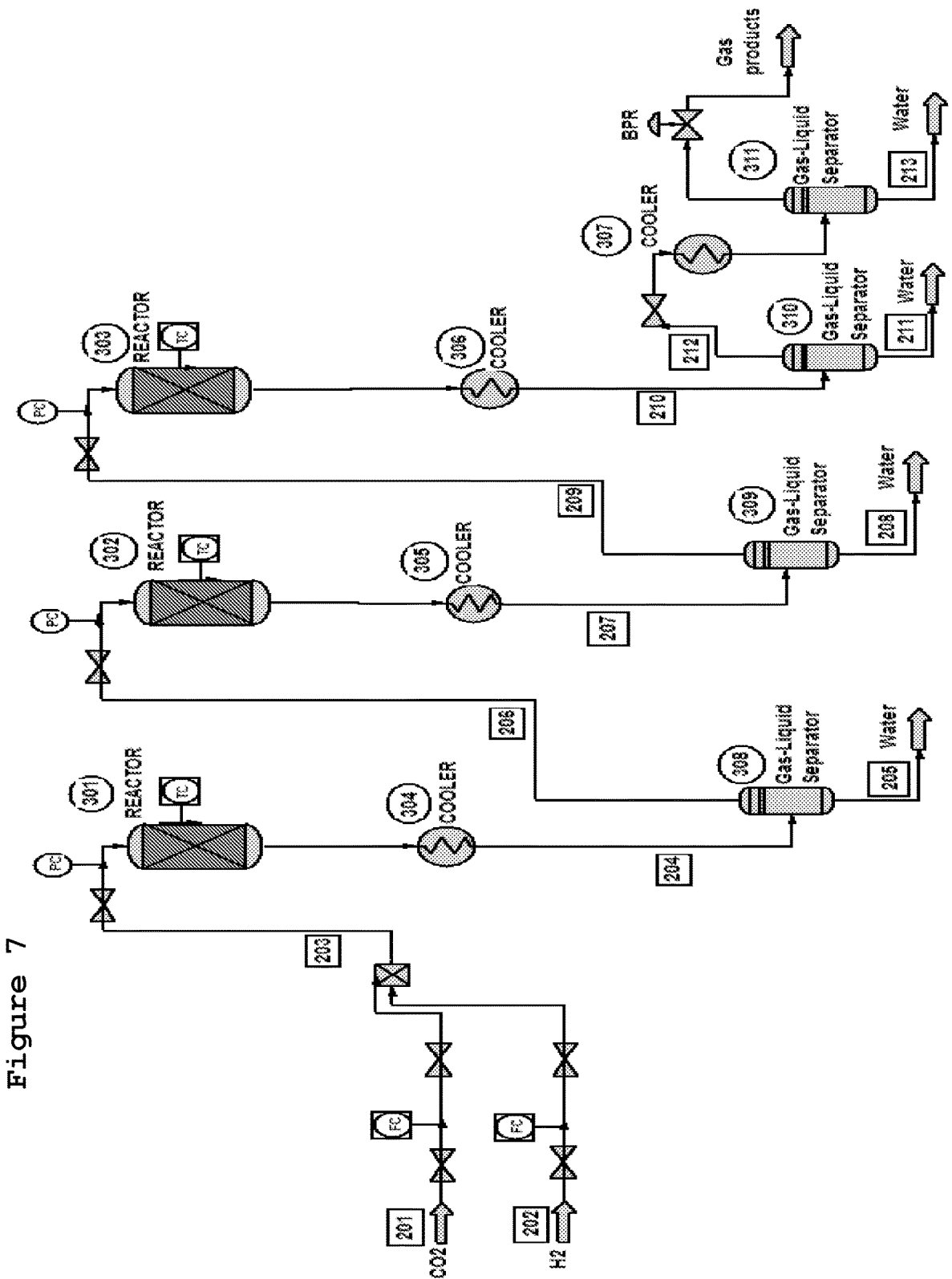
FIG. 7 depicts a schematic description of an experimental set up for RWGS reaction with carbon dioxide and hydrogen in a fixed bed reactor.

A schematic description of the experimental set-up used for the production of carbon monoxide from carbon dioxide and hydrogen is shown in FIG. 7.

The experimental unit consists of three 16 mm ID, 250 mm long tubular reactors in series, equipped with an electrical heater and a central thermowell, four coolers, four vapor-liquid separators, Brooks flowmeter for $H_2$ and $CO_2$, and a backpressure regulator. The axial temperature profile is measured by a movable thermocouple. Pressure is controlled by a backpressure regulator.

$CO_2$ was contacted with $H_2$ by passing a mixture of $CO_2$ and $H_2$ streams (indicated by numerals (201) and (202) respectively) at a molar ratio 1:1 through the first tubular reactor (301) packed with 2.5 gram of the $TiO_2$—Au(1%) extrudates and heated up to 400° C. at a total pressure of 8 atm. All gaseous reactants are fed via line (203) to the reactor (301).

With the aid of a cooler (304), the reaction products are cooled down to 60° C., undergoing condensation to form a mixture consisting of non-condensable and water generated by the reverse water gas shift reaction. The mixture (204) is separated in a gas-liquid separator (308) into gas phase and water which are collected through line (205).

The gaseous component flows (206) to the second tubular reactor (302) packed with 2.5 gram of $TiO_2$—Au(1%) extrudates and heated up to 400° C.

With the aid of the second cooler (305), the reaction products are cooled down to 60° C. (207) to separate the water (208) generated from the second reactor (302) in a gas-liquid separator (309).

The gaseous stream flows (209) to the third tubular reactor (303) packed with 2.5 grams of $TiO_2$—Au(1%) extrudates catalyst and heated up to 400° C.

The products of the third reactor are cooled in cooler (306) down to 60° C. condensing to a water (211) component which is separated from the non-condensable component (212) in a gas-liquid separator (310).

The gaseous phase is further cooled in cooler (307) down to 5° C. and separated into water (213) and a gaseous component consisting of $CO_2$, $H_2$, CO and residual $CH_4$ generated by the methanation reaction.

The gas products were analyzed in online Agilent 7890A Series Gas Chromatograph equipped with 7 columns and 5 automatic valves using helium as a carrier gas.

In the table below, the capital letters X and S stand for conversion and selectivity, respectively. The weight selectivity to CO and $CH_4$ was calculated on the carbon basis as $S_i = \Sigma C_i * 100\%$, where $C_i$ is the amount of carbon (gram) contained in product (i) produced at period of time, $\Sigma C_i$ is the amount of carbon (gram) contained in all gaseous produced over the same period of time.

The reaction of carbon dioxide with hydrogen to carbon monoxide was run under the following specific conditions: $WHSV_{CO2}=3.7$ $h^{-1}$, temperature 400° C., total pressure at the reactor 8 atm, $H_2/CO_2=1.0$ mol/mol. The time on stream was 114 hours. The results are shown in Table 8.

TABLE 8

| $X_{CO2}$, % | $X_{H2}$, % | $S_{CO}$ wt % | $S_{CH4}$ wt % | H2/CO molar ratio at outlet |
|---|---|---|---|---|
| 31.5 | 31.9 | 99.9 | 0.1 | 2.1 |

Preparation 1
Preparation of Potassium-Promoted $Fe^{2+}(Fe^{3+}_y Al^{3+}_{1-y})_2O_4$, Silica-Containing Extrudates (y=0.47)

The catalytically active compound was prepared by co-precipitation from an aqueous solution of Fe and Al nitrates, induced by the addition of aqueous ammonium hydroxide solution. 27.0 gram of $Al(NO_3)_3.9H_2O$ and 57.9 gram of $Fe(NO_3)_3.9H_2O$ were dissolved in 60 cm³ of distilled water each. The solutions were then mixed together and the pH of the combined solution was adjusted to 8 by adding 250 cm³ of aqueous $NH_4OH$ solution with concentration of ammonium hydroxide of 5 wt %. The obtained solid was filtered and washed with distilled water and further dried at 110° C. for 24 hours. In the present example the atomic ratio of Fe:Al in the precipitating solution was 2:1. The dried spinel material was grinded using a ball mill to particle size <180 μm, and mixed-kneaded with $SiO_2$ precursor (Ludox® HS-30) at a weight ratio spinel/$SiO_2$ 70/30 in a horizontal mixing kneader machine equipped with two Z-type blades, heating mantle and a cover for closing it hermetically (The $SiO_2$ precursor was brought to pH=7 in a vessel by few drops of 5M solution of $HNO_3$ in water before addition to kneader; the spinel powder was added to the kneader after addition of SiO$_2$ precursor with adjusted pH). The obtained mixture was mixed-kneaded in the hermetically closed kneader at temperature of 40° C. for 5 h. The obtained gel was discharged from the kneader and formed into pellets by extrusion through a die with openings diameter of 2.5 mm, followed by cutting the extruded wire into extrudates with a length of 15 mm (a single-screw extruder was used). The extrudates were aged in air at room temperature for 24 hours. The aged extrudates were dried in air at 110° C. for 6 hours followed by calcination in air at 350° C. for period of 6 hours. No Fe$_2$O$_3$ hematite phase was formed after calcination at 350° C. The calcined extrudates had diameter of 1.6 mm and length of 6-10 mm. An aqueous solution of K$_2$CO$_3$ was added by incipient wetness impregnation. The solid was further dried in air at 110° C. for 4 hours followed by calcination in air at 450° C. for period of 3 h. No change in the shape and size of the extrudates was detected at the impregnation step. The material had the following weight ratio of metal components (EDAX): Fe:Al:K=100:24:14.6, surface area 203 m$^2$/gram, pore volume 0.31 cm$^3$/gram and average pore diameter 6.1 nm.

Preparation 2

(Catalyst for Use in Dry Reforming)

Ni-substituted hexaaluminate catalyst with the general formula BaNi$_x$Al$_{11-x}$O$_{19-\delta}$ was prepared by co-precipitation from a solution of the corresponding metal nitrate salts by addition of ammonium carbonate at pH=7.5-8.0. Metal nitrates were dissolved separately in deionized water at 60° C. The clear solutions of metal nitrates (with the exception of aluminum nitrate) were then mixed together, followed by adjusting the pH value to ~1 with the aid of nitric acid, before adding the aluminum nitrate solution into the metal nitrate mixture. The resulting solution was then poured at 60° C. with vigorous stirring into an aqueous solution containing a large excess of (NH$_4$)$_2$CO$_3$ to form the hexaaluminate precursor precipitate. During the precipitation, a large amount of CO$_2$ was released while the pH value of the solution was maintained between 7.5 and 8.0. The resulting slurry was aged with continuous stirring at 60° C. for 3 h followed by filtration and washing with deionized water. The obtained cake was then dried at 110° C. in air overnight. The powder was further calcined at 500° C. for 2 h, followed by calcination at 1300° C. and 1400° C. for 3-5 h.

The resulting powder was crushed and sieved to collect the fraction smaller than 160 μm. XRD analysis yielded the following phases: Ba$_{0.69}$Ni$_{0.48}$Al$_{6.36}$O$_{11}$ 95%, α-Al$_2$O$_3$-5%. The BET surface area is 12 cm$^2$/g.

Preparation 3

(Catalyst for Use in RWGS)

The catalyst was prepared by inserting the gold into titania by adsorption method. 0.054-0.382 g hydrogen tetrachloroaurate (III) dihydrate (HAuCl$_4$.2H$_2$O, Alfa Aesar 99.9%) were dissolved in 300 ml of distilled water and the pH was adjusted to 10 by adding droplets of 1.0 M NaOH water solution under vigorous stirring and monitored with a pH meter. The resulting solution was heated to 65° C., then 10.0 g TiO$_2$ (Saint-Gobain NorPro Co.) was added. The mixture was stirred for 2 h while 0.1M NaOH water solution was added into the slurry to adjust the pH value to 9.0. The as-received precipitate was collected by filtration, washed with 1 L of distilled water, and dried in air overnight at 100° C. followed by calcination under 1.8 Li h·g O$_2$ flow by ramping the temperature at 5° C./min and O$_2$ flow and kept for 1 hr at 300° C.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A process for preparing liquid fuels and chemicals, which process comprises feeding carbon monoxide and hydrogen to a hydrogenation reactor, wherein the molar ratio CO:H$_2$ is in the range of 1:0.5 to 1:0.9, catalytically hydrogenating said carbon monoxide in said hydrogenation reactor to produce a hydrogenation effluent, condensing the effluent of said hydrogenation reactor to recover one or more organic liquid(s) and an aqueous solution, feeding a non-condensable component of said effluent into an oligomerization reactor; condensing an effluent discharged from the oligomerization reactor to obtain an additional organic liquid and an additional gaseous stream, separating said additional organic liquid, and either combusting said additional gaseous stream to produce heat and electricity, or processing said additional gaseous stream to obtain recyclable gaseous streams utilizable in said process, wherein the carbon monoxide and hydrogen feedstock is supplied by dry reforming carbon dioxide with natural gas or co-electrolysis of carbon dioxide and steam, wherein the process further comprises splitting the additional gaseous component generated in the oligomerization reaction into a carbon monoxide stream and carbon monoxide-depleted, carbon dioxide-rich stream, recycling said carbon monoxide stream to the hydrogenation reactor; dividing said carbon monoxide-depleted, carbon dioxide-rich stream into two subsidiary streams, wherein one subsidiary CO$_2$-containing stream is used to supply CO$_2$ to said dry reforming reaction or said co-electrolysis, and the other CO$_2$-containing stream is reacted with hydrogen in reverse water gas shift reactor to produce CO and water, following which the effluent of said RWGS reactor is separated into water and CO-containing stream which is used to supply CO to the hydrogenation reaction.

2. A process for preparing liquid fuels and chemicals, which process comprises feeding carbon monoxide and hydrogen to a hydrogenation reactor, wherein the molar ratio CO:H$_2$ is in the range of 1:0.5 to 1:0.9, catalytically hydrogenating said carbon monoxide in said hydrogenation reactor to produce a hydrogenation effluent, condensing the effluent of said hydrogenation reactor to recover one or more organic liquid(s) and an aqueous solution, feeding a non-condensable component of said effluent into an oligomerization reactor; condensing an effluent discharged from the oligomerization reactor to obtain an additional organic liquid and an additional gaseous stream, separating said additional organic liquid, and either combusting said additional gaseous stream to produce heat and electricity, or processing said additional gaseous stream to obtain recyclable gaseous streams utilizable in said process, comprising producing a mixture of carbon monoxide and hydrogen either by means of dry reforming carbon dioxide or co-electrolysis of carbon dioxide and steam, separating hydrogen in part from said mixture, to form syngas feedstock, feeding said syngas— wherein the molar ratio CO:H$_2$ is in the range of 1:0.5 to 1:0.9 to a hydrogenation reactor, catalytically hydrogenating said carbon monoxide in said hydrogenation reactor to produce a hydrogenation effluent, condensing the effluent of said hydrogenation reactor at a first temperature to obtain a first organic liquid and a first gaseous stream, separating said first organic liquid and collecting same; condensing said first gaseous stream at a second temperature to obtain a second liquid, which consists of an organic phase and an aqueous phase, and a second gaseous stream; separating said second liquid into a second organic liquid and an aqueous phase;

feeding said second gaseous stream into the oligomerization reactor; condensing the effluent discharged from the oligomerization reactor to obtain a third organic liquid and a third gaseous stream, separating and collecting third organic liquid, splitting said third gaseous component into a carbon monoxide stream and carbon monoxide-depleted, carbon dioxide-rich stream, recycling said carbon monoxide stream to said hydrogenation reactor; dividing said carbon monoxide-depleted, carbon dioxide-rich stream into two subsidiary streams, wherein one subsidiary $CO_2$-containing stream is used to supply $CO_2$ to said dry reforming reaction or said co-electrolysis, and the other $CO_2$-containing stream is reacted with hydrogen in reverse water gas shift (RWGS) reactor to produce CO and water, following which the effluent of said RWGS reactor is separated into water and CO-containing stream which is used to supply CO to said hydrogenation reaction, hydrotreating one or more organic products collected in the process to form premium liquid fuels, and converting oxygenates in the aqueous solution into olefins which are fed to the oligomerization reactor.

3. A process for preparing liquid fuels and chemicals, which process comprises feeding carbon monoxide and hydrogen to a hydrogenation reactor, wherein the molar ratio CO:$H_2$ is in the range of 1:0.5 to 1:0.9, catalytically hydrogenating said carbon monoxide in said hydrogenation reactor to produce a hydrogenation effluent, condensing the effluent of said hydrogenation reactor to recover one or more organic liquid(s) and an aqueous solution, feeding a non-condensable component of said effluent into an oligomerization reactor; condensing an effluent discharged from the oligomerization reactor to obtain an additional organic liquid and an additional gaseous stream, separating said additional organic liquid, and either combusting said additional gaseous stream to produce heat and electricity, or processing said additional gaseous stream to obtain recyclable gaseous streams utilizable in said process, wherein the carbon monoxide and hydrogen feedstock is supplied from waste gases characterized by having $H_2$/CO molar ratio of <0.5, the process comprises subjecting said waste gas to water gas shift (WGS) reaction to convert part of the CO so that the $H_2$/CO molar ratio increases, and separating excess hydrogen in a membrane so that the $H_2$/CO molar ratio of the stream fed to CO hydrogenation reactor is adjusted to about 0.6-0.8, and hydrogenating the product of said WGS reaction.

4. A process for preparing liquid fuels and chemicals, which process comprises feeding carbon monoxide and hydrogen to a hydrogenation reactor, wherein the molar ratio CO:$H_2$ is in the range of 1:0.5 to 1:0.9, catalytically hydrogenating said carbon monoxide in said hydrogenation reactor, to produce a hydrogenation effluent, condensing the effluent of said hydrogenation reactor to recover one or more organic liquid(s) and an aqueous solution, feeding a non-condensable component of said effluent into an oligomerization reactor; condensing an effluent discharged from the oligomerization reactor to obtain an additional organic liquid and an additional gaseous stream, separating said additional organic liquid, and either combusting said additional gaseous stream to produce heat and electricity, or processing said additional gaseous stream to obtain recyclable gaseous streams utilizable in said process, wherein the carbon monoxide and hydrogen feedstock is supplied from waste gases characterized by having $H_2$/CO molar ratio of >0.9, the process comprises subjecting said waste gas to RWGS reaction, condensing the product of the RWGS reaction to obtain water and non-condensable component, separating water from the gaseous component and separating hydrogen therefrom, and directing the gaseous stream to the hydrogenation reaction.

* * * * *